April 28, 1936.  A. N. PASMAN  2,038,852
SINK STRAINER FOR DRAIN OPENINGS AND THE LIKE
Filed June 27, 1935
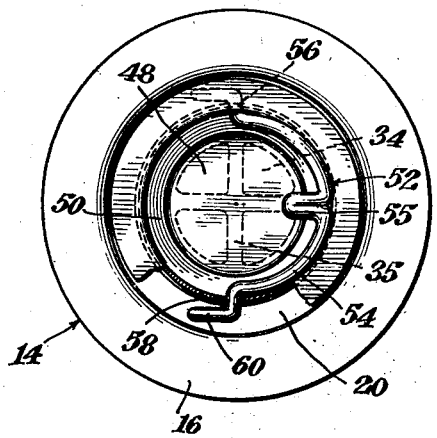
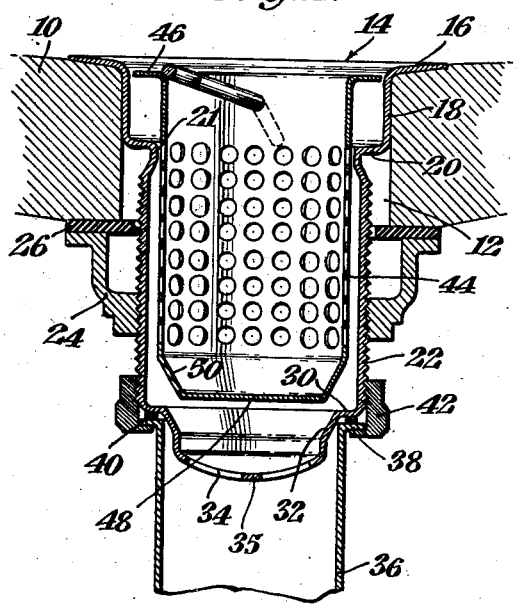
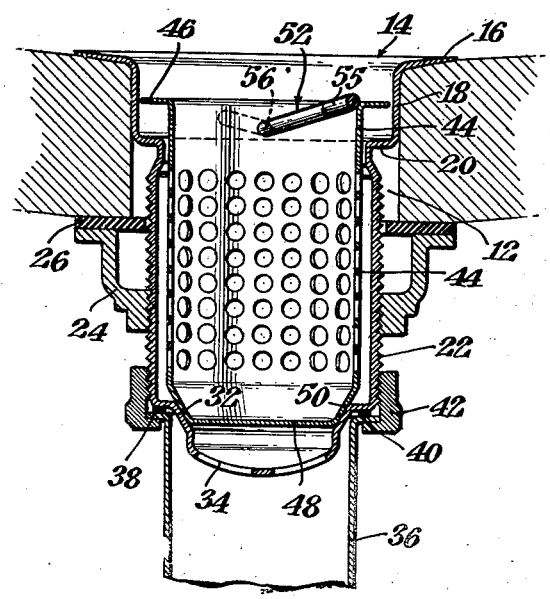
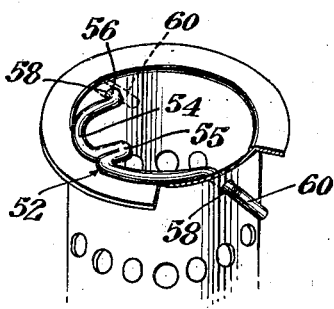
INVENTOR
Abram N. Pasman
BY
Prindle Bean & Mann
ATTORNEYS Patented Apr. 28, 1936

2,038,852

UNITED STATES PATENT OFFICE 2,038,852

SINK STRAINER FOR DRAIN OPENINGS AND THE LIKE

Abram N. Pasman, Milford, Conn.

Application June 27, 1935, Serial No. 28,639

9 Claims. (Cl. 4—291)

This invention relates to removable sink strainers or perforated containers for drain openings.

Sink strainers have been in use but in such strainers it is necessary to fit the strainer in the drain opening by alining slots and lugs or projections. In other words, the user has to be careful to replace the strainer in a predetermined position or else it will not operate. In these prior strainers one position usually is a correct position. I have invented a new sink strainer or perforated container which is operative in any position and which does not need to be correctly positioned in the drain opening. It is only necessary to place the strainer or perforated container within the drain pipe and move a handle or bail on the strainer or container to one position or the other to place the strainer in open or closed position. The bottom of the strainer is closed and has a valve which cooperates with a valve seat positioned in the drain pipe, so that when the strainer is in lowered position the valve is closed and when the strainer is in raised position the valve is open and permits the flow of liquid through the drain opening. The strainer is removably mounted within the drain opening so that it may be taken by the handle or bail and removed and crumbs or other solid material may be taken out and thrown away without the possibility of clogging up the drain opening. The handle or bail which is operated to raise or lower the strainer or container is also used when the strainer or container is removed from the drain opening.

The object of my invention is to provide a removable sink strainer or perforated container which is cheap to manufacture and which is very easily operated in any position and which is also provided with means whereby the flow of liquid from the sink or other liquid container may be controlled.

In the drawing:

Fig. 1 represents a top plan view of a device made according to my invention, a part being broken away to facilitate the disclosure;

Fig. 2 represents a vertical longitudinal section taken through a device applied to a drain opening, the perforated container or strainer being shown in raised position;

Fig. 3 represents a view similar to that shown in Fig. 2 with the perforated container or strainer in lowered position so as to close the valve and prevent the outflow of liquid through the drain opening; and Fig. 4 represents a perspective view of a part of the perforated container or strainer.

Referring now to the drawing, the reference character 10 designates a portion of a sink or the like provided with a drain opening 12 in which a device made according to my invention is mounted. The tubular member 14 positioned in opening 12 is provided with a flange 16 which rests on the top of the wall of the container or sink 10. The tubular member or coupling 14 has an annular or sleeve portion 18 which fits the drain opening. Beneath the portion 18 the tubular member has an annular shoulder or ledge 20 which extends inwardly. Beneath shoulder or ledge 20, the tubular member is formed with an annular bead 21 which assists in guiding the strainer or perforated container later to be described. The lower portion of tubular member 14 is threaded as at 22, this threaded portion has a slightly smaller diameter than the sleeve portion 18. The clamping nut 24 is threaded on the threaded portion 22 and clamps the washer 26 against the underside of the wall of the sink or container 10 to form a water tight joint. Adjacent its lower end the tubular member is provided with an inwardly directed flange 30. Extending downwardly and inwardly from the flange 30 is the tapering portion 32 which forms a valve seat. The lower end of the tubular member 14 is provided with openings 34 formed by straps 35 to form a supplemental strainer.

Connected to the lower end of the tubular member 14 and forming an extension thereof is a pipe 36 having a flange 38 which is held against washer 40 abutting the underside of the inwardly directed flange 30 on the tubular member by the coupling or clamping member 42.

Removably mounted within the tubular member is a strainer or perforated container 44. The strainer 44 has an annular flange 46 which is received within the annular or sleeve portion 18 of the tubular member to assist in positioning the strainer within the tubular member. The lower end of the strainer or perforated member 44 is closed as at 48 and is connected to the body of the strainer 44 by the tapered annular portion 50 forming a valve on the lower end of the strainer 44. The valve 50 cooperates with the valve seat 32 on the tubular member so as to close the outlet from the sink or the like when the strainer is in lowered position as shown in Fig. 3.

The strainer or perforated container 44 is provided with means adjacent its upper end whereby the strainer or perforated container may be moved to open or close the valve at the bottom of the tubular member 14. This same means serves as a handle when it is desired to remove the strainer from the tubular member 14. This means comprises a handle 52 which is pivotally mounted adjacent the top of the strainer or perforated container. This handle 52 comprises a curved portion 54 formed with a projection 55 which facilitates operation of the handle 52. The handle also has angular portions 56 which extend through openings 58 in the wall of the perforated container 44 and form the pivotal mounting. The ends of the handle comprise legs or extensions 60 which are adapted to cooperate with the shoulder or ledge 20 on the tubular member 14 to move the perforated container into raised position. When the handle 52 is turned or rotated to the position shown in Fig. 2, the ends of the legs or extensions 60 of the handle 52 are moved against the shoulder or ledge 20 of the tubular member 14 to act as a lever and to raise the perforated container. In this raised position the valve 50 on the perforated container is raised or moved away from the valve seat 32 on the tubular member 14 and in this position liquid is permitted to flow from the sink or other container. When the handle is moved or rotated to the position shown in Fig. 3 the handle parts become inoperative and the perforated container or strainer is in lowered position so that the valve 50 rests on the valve seat 32 and prevents the flow of liquid from the sink or the like. The handle 52 is pivoted substantially centrally of the strainer so that in either position shown in Fig. 2 or Fig. 3 the handle abuts or rests on the top of the container and so is maintained in an easily accessible position.

The operation of the device will be apparent from the above description. When it is desired to keep liquid in the sink or the container, the handle 52 is moved to the position shown in Fig. 3 so that the legs or extensions 60 on the handle do not rest on the ledge or shoulder 20 on the tubular member 14. In this position the valve formed by the lower portions of the strainer and the tubular member is closed. When it is desired to permit the flow of liquid from the sink or container, the handle 52 is moved or rotated to the position shown in Fig. 2 and during such movement the legs or extensions 60 on the handle act as levers on the ledge or shoulder 20 to raise the strainer or perforated container so that the valve 50 on the strainer is moved away from the valve seat 32 on the tubular member 14 and liquid is permitted to flow from the sink or the other container. If the water in the sink or container contains solid particles or other solid material, the strainer retains them and permits the liquid to flow through the strainer. After the liquid is emptied from the sink or container, the strainer or perforated container 44 is removed by grasping the handle 52 and the contents thereof emptied. After this operation the strainer is returned to the tubular member and is placed in either of the positions shown in Figs. 2 or 3. From the foregoing it will be apparent that it is not necessary to replace the strainer in any particular position as the strainer may be operated in any position, that is the legs or extensions 60 may always be made to cooperate with the ledge or annular shoulder formed on the tubular member 14 to place the strainer in either raised or lowered position.

From the foregoing it will be apparent that I have disclosed a relatively simple strainer or cup container which is cheap to manufacture and which is easily operated in any position.

What I claim is:

1. A device of the character described, including a tubular member adapted to be positioned in the drain openings of sinks or the like, said tubular member having a valve seat adjacent its lower end, a perforated container mounted in said tubular member and having a closed bottom end, said container adjacent said closed end having a valve adapted to cooperate with said valve seat on said tubular member to permit or prevent flow of liquid through said tubular member.

2. A device of the character described, including a tubular member adapted to be positioned in drain openings, said tubular member having a shoulder adjacent the one end and a valve seat adjacent its other end, a container having openings in its wall, said container being removably mounted in said tubular member and having a closed bottom end, said container adjacent its lower end having a valve adapted to cooperate with said valve seat on said tubular member, and means on said container associated with said shoulder on said tubular member for moving said valve on said container away from said valve seat on said tubular member to permit the flow of liquid through said tubular member.

3. A device of the character described, including a tubular member adapted to be positioned in drain openings, said tubular member having a shoulder adjacent the one end and a valve seat adjacent its other end, a container having openings in its wall, said container being removably mounted in said tubular member and having a closed bottom end, said container adjacent its lower end having a valve adapted to cooperate with said valve seat on said tubular member, and means on said container associated with said shoulder on said tubular member for moving said valve on said container away from said valve seat on said tubular member to permit the flow of liquid through said tubular member, said means including a handle or bail member pivotally mounted on said container and including legs or extensions adapted to cooperate with said shoulder on said tubular member.

4. A device of the character described, including a tubular member adapted to be positioned in drain openings, said tubular member having an annular shoulder or flange adjacent its one end and a valve seat adjacent its other end, a container or strainer having openings in its wall, said container or strainer being removably mounted in said tubular member and having a closed bottom end, said container adjacent its lower end having a valve adapted to cooperate with said valve seat on said tubular member, and a handle pivotally mounted adjacent the upper end of said container or strainer and associated with said annular shoulder or flange on said tubular member whereby the valve on said container or strainer may be moved away from the valve seat on said tubular member.

5. A device of the character described, including, a tubular member adapted to be positioned in drain openings, said tubular member having a shoulder adjacent its one end and a valve seat adjacent its other end, a perforated container removably mounted in said tubular member and having a closed bottom end, said container adjacent its lower end having a valve adapted to cooperate with said valve seat on said tubular member, and a handle pivotally mounted on said perforated container and provided with legs or extensions adapted to cooperate with the shoulder on said perforated container to move said container away from said valve seat on said tubular member, said handle being movable to open or to permit closing of said valve and being easily accessible in either of the positions.

6. A device of the character described, including, a tubular member adapted to be positioned in drain openings, said tubular member having a shoulder adjacent its one end and a valve seat adjacent its other end, a perforated container removably mounted in said tubular member and having a closed bottom end, said container adjacent its lower end having a valve adapted to cooperate with said valve seat on said tubular member, and a handle pivotally mounted on said perforated container and provided with legs or extensions adapted to cooperate with the shoulder on said perforated container to move said container away from said valve seat on said tubular member, said handle being movable to open or to permit closing of said valve and being easily accessible in either of the positions, said handle in either of the positions resting on the top of said container so as to be easily reached and manipulated.

7. A device of the character described, including, in combination, a tubular member adapted to be positioned and held in drain openings of sinks or the like, a container having openings in its wall, said container being removably mounted in said tubular member, valve means on said container and said tubular member, and a handle or bail member pivotally mounted on said container, said handle or bail member being provided with means adapted to cooperate with said tubular member whereby movement of said handle or bail member opens or closes said valve means to permit or prevent the flow of liquid through said tubular member.

8. A device of the character described, including a tubular member adapted to be positioned in the drain openings of sinks and the like, said tubular means having a valve seat, a container having openings in its wall mounted in said tubular member, said container having a valve adapted to cooperate with said valve seat on said tubular member to permit or prevent the flow of liquid through said tubular member, and means pivotally mounted on said container whereby said container may be moved to different positions.

9. A strainer of the character described adapted to be removably mounted in drain openings, said strainer including a container having a perforated cylindrical body and a closed bottom end with a tapering wall to form a valve, and a handle or bail member pivotally mounted on said container, said handle or bail member being provided with means whereby said container may be removed from a drain opening or be moved to a partly raised position to place the valve thereon in open position.

ABRAM N. PASMAN.